United States Patent
Ledoux et al.

(10) Patent No.: US 10,222,299 B2
(45) Date of Patent: Mar. 5, 2019

(54) SYSTEM FOR EVALUATING THE CONDITION OF A TIRE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Thomas Ledoux, Clermont-Ferrand (FR); Alexandre Pernot, Clermont-Ferrand (FR); Denis Martin, Clermont-Ferrand (FR); Alexandre Pagès, Meylan (FR); Timothée Forissier, Meylan (FR); Guillaume Heredia, Clermont-Ferrand (FR); Frank Claeyssen, Meylan (FR)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 64 days.

(21) Appl. No.: 15/305,465

(22) PCT Filed: Apr. 30, 2015

(86) PCT No.: PCT/EP2015/059563
§ 371 (c)(1),
(2) Date: Oct. 20, 2016

(87) PCT Pub. No.: WO2015/166074
PCT Pub. Date: Nov. 5, 2015

(65) Prior Publication Data
US 2017/0038278 A1    Feb. 9, 2017

(30) Foreign Application Priority Data
May 2, 2014    (FR) ...................................... 14 54016

(51) Int. Cl.
*G01M 17/02* (2006.01)
*B60C 11/24* (2006.01)
(Continued)

(52) U.S. Cl.
CPC ........... *G01M 17/02* (2013.01); *B60C 11/243* (2013.01); *B60C 11/246* (2013.01);
(Continued)

(58) Field of Classification Search
CPC .... G01M 17/02; B60C 11/243; B60C 11/246; B60C 25/007
(Continued)

(56) References Cited

U.S. PATENT DOCUMENTS

| 3,183,481 A | 5/1965 | McCrory | 340/52 |
| 5,260,520 A * | 11/1993 | Muhs | G01G 19/03 177/1 |

(Continued)

FOREIGN PATENT DOCUMENTS

| CN | 1042230 A | 5/1990 |
| CN | 1495010 A | 5/2004 |

(Continued)

OTHER PUBLICATIONS

Jun. 18, 2015 International Search Report and Written Opinion in International Patent Appln. No. PCT/EP2015/059563.

*Primary Examiner* — Son T Le
*Assistant Examiner* — Tarun Sinha
(74) *Attorney, Agent, or Firm* — Venable LLP

(57) ABSTRACT

A system, which is structured to evaluate a condition of a tire, includes a housing, a tire-wear detector, a tire-presence detector, and an electronic activator. The housing, when the system is deployed, is placed on a ground surface. The tire-presence detector detects a presence of a tire on the housing. The electronic activator activates the tire-wear
(Continued)

detector when the tire-presence detector detects the presence of the tire on the housing. The tire-wear detector, when activated, detects a wear condition of the tire when the tire passes over the housing.

19 Claims, 13 Drawing Sheets

(51) Int. Cl.
    *B60C 25/00*     (2006.01)
    *B60C 25/05*     (2006.01)
    *G01B 7/26*     (2006.01)

(52) U.S. Cl.
    CPC ........ *B60C 25/007* (2013.01); *B60C 25/0551* (2013.01); *G01B 7/26* (2013.01)

(58) Field of Classification Search
    USPC .......................................................... 73/146
    See application file for complete search history.

(56) References Cited

U.S. PATENT DOCUMENTS

| | | | |
|---|---|---|---|
| 5,554,907 A * | 9/1996 | Dixon | G08G 1/02 310/319 |
| 5,945,131 A | 8/1999 | Harvey et al. | |
| 6,482,286 B1 | 11/2002 | Harvey et al. | |
| 6,660,121 B2 | 12/2003 | Harvey et al. | |
| 7,788,977 B2 | 9/2010 | Nagata | |
| 7,797,995 B2 * | 9/2010 | Schafer | B60C 11/24 73/146 |
| 8,851,354 B2 | 10/2014 | Swensgard et al. | |
| 9,307,987 B2 | 4/2016 | Swensgard et al. | |
| 2002/0169439 A1 * | 11/2002 | Flaherty | A61M 5/14248 604/891.1 |
| 2003/0041957 A1 | 3/2003 | Harvey et al. | |
| 2004/130056 A1 | 7/2004 | Harvey et al. | |
| 2004/0201124 A2 | 10/2004 | Harvey et al. | |
| 2007/0001059 A1 * | 1/2007 | Appleby | B61L 1/06 246/122 R |
| 2007/0035060 A1 | 2/2007 | Harvey et al. | |
| 2008/0084180 A1 * | 4/2008 | Hasegawa | H01M 2/34 320/112 |
| 2008/0256815 A1 | 10/2008 | Schafer | 33/739 |
| 2009/0000370 A1 | 1/2009 | Lionetti et al. | 73/146 |
| 2010/0011856 A1 * | 1/2010 | Nagata | G01C 19/56 73/504.12 |
| 2010/0139383 A1 * | 6/2010 | Haswell | B60C 11/24 73/146 |
| 2011/0155781 A1 | 6/2011 | Swensgard et al. | |
| 2015/0038986 A1 | 2/2015 | Swensgard et al. | |
| 2016/0153763 A1 | 6/2016 | Ledoux et al. | G01M 17/02 |
| 2016/0161243 A1 | 6/2016 | Ledoux et al. | G01B 7/26 |
| 2016/0169657 A1 | 6/2016 | Ledoux et al. | G01B 7/26 |
| 2016/0183944 A1 | 6/2016 | Swensgard et al. | |
| 2017/0038278 A1 | 2/2017 | Ledoux et al. | G01M 17/20 |
| 2017/0322012 A1 | 11/2017 | Ledoux et al. | G01B 7/10 |
| 2017/0322117 A1 | 11/2017 | Ledoux et al. | G01M 17/02 |
| 2017/0341659 A1 | 11/2017 | Duvernier et al. | B60W 40/09 |
| 2017/0350781 A1 | 12/2017 | Ledoux et al. | G01L 17/005 |
| 2017/0350792 A1 | 12/2017 | Ledoux et al. | G01M 17/021 |
| 2018/0009271 A1 | 1/2018 | Ledoux et al. | B60C 11/246 |

FOREIGN PATENT DOCUMENTS

| | | |
|---|---|---|
| CN | 1851391 A | 10/2006 |
| CN | 101184973 A | 5/2008 |
| CN | 102665575 A | 9/2012 |
| DE | 18 09 459 A1 | 6/1970 |
| DE | 20 2014 001 427 U1 | 4/2014 |
| EP | 0 384 874 A2 | 8/1990 |
| EP | 0 469 948 A1 | 2/1992 |
| EP | 0 656 269 A1 | 6/1995 |
| FR | 2 201 511 | 4/1974 |
| FR | 2 625 808 A1 | 7/1989 |
| GB | 2 443 965 A | 5/2008 |
| GB | 2 512 411 A | 10/2014 |
| WO | WO 2006/098714 A1 | 9/2006 |
| WO | WO 2007/059935 A1 | 5/2007 |

* cited by examiner

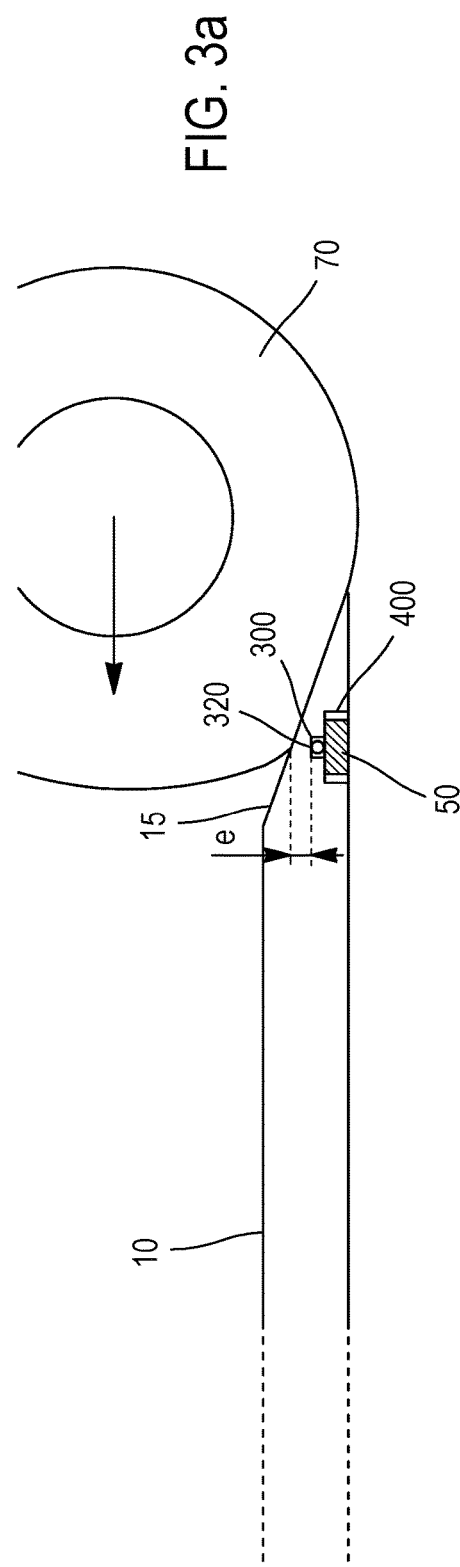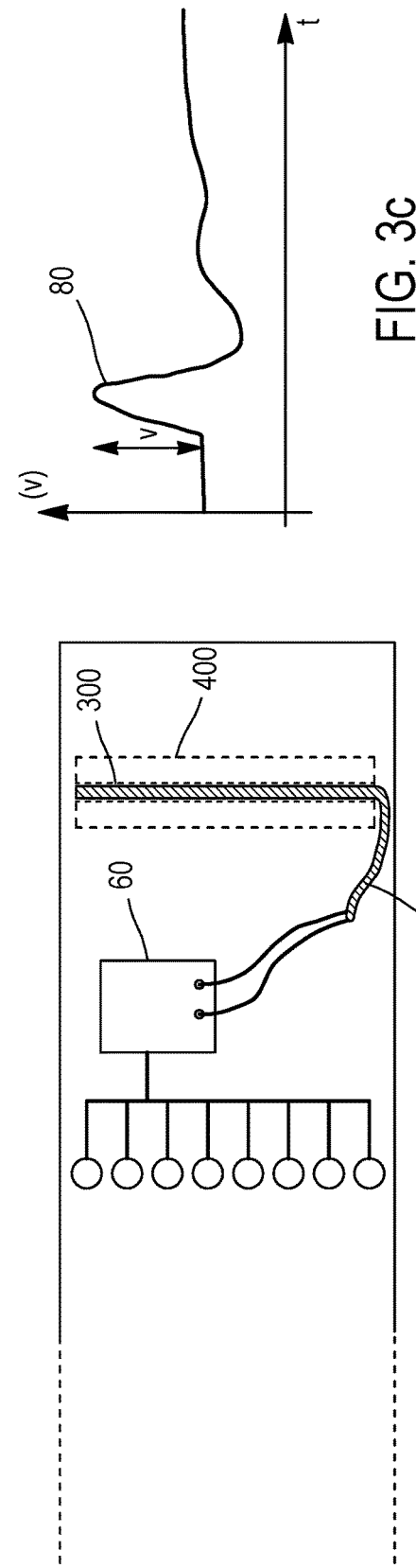

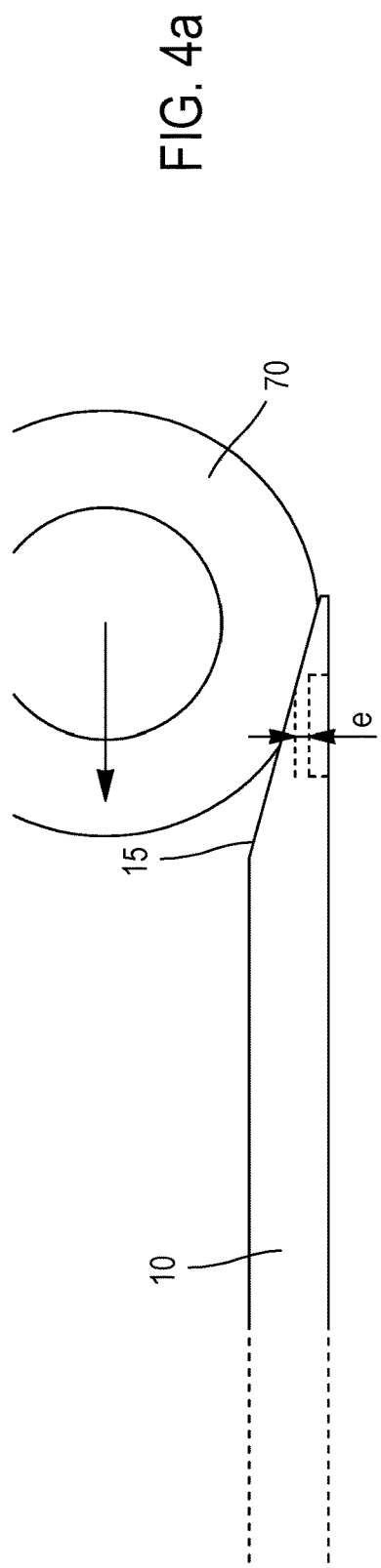
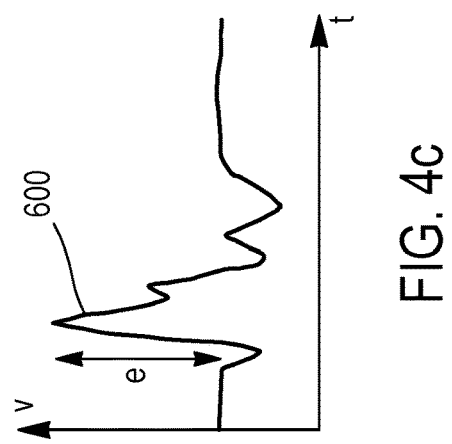
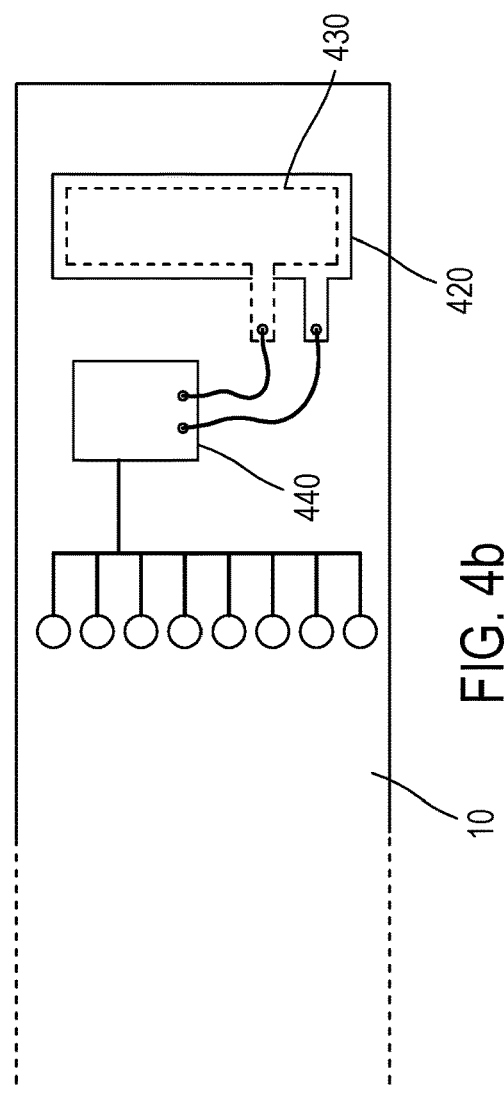

SYSTEM FOR EVALUATING THE CONDITION OF A TIRE

FIELD OF THE INVENTION

The present invention relates to a system for evaluating the condition of a tire, and more particularly the wear condition of a tire.

As is known, the tire tread of a pneumatic tire, whether it is intended to be provided on a passenger, heavy goods, civil engineering or other vehicle is provided with a pattern comprising, in particular, pattern elements or elementary blocks delimited by various main longitudinal, transverse or oblique grooves, wherein the elementary blocks can further include various incisions or thinner sipes. The grooves form channels for draining off water when travelling on wet ground and define the leading edges of the pattern elements.

When a pneumatic tire is new, the tread is at the maximum height thereof. This starting height can vary depending on the type of pneumatic tire in question and the use for which it is intended; for example, "winter" pneumatic tires generally have a pattern depth greater than that of "summer" pneumatic tires. When the tire wears down, the height of the elementary blocks of the pattern decreases and the stiffness of these elementary blocks increases. Increasing stiffness of the pattern elementary blocks leads to a reduction of some performances of the pneumatic tire, such as the grip on wet ground. In addition, the water draining capacities decrease significantly when the depth of the channels of the patterns decreases.

It is therefore desirable to be able to monitor the progression of the wear of the tread of a pneumatic tire.

Document US 2009/0000370 describes a measuring system comprising a rolling bench intended to accommodate the passing of a vehicle. The system comprises an energy source that emits a wireless signal in the direction of the tire, and a sensor which detects a signal returned by the tire. Using this return signal, a monitoring unit determines the depth of the pattern of the tire. However, it was found that this system requires a constant power supply to the various elements, and thus only offers low autonomy.

The aim of the present invention, therefore, is to overcome this disadvantage, by proposing an autonomous system for evaluating the condition of a tire.

BRIEF DESCRIPTION OF THE INVENTION

Therefore, the invention proposes a system for evaluating the condition of a tire, the system comprising a first housing placed on the ground and a device for detecting the wear of a tire when the tire passes over said first housing, said system further comprising
  a first device for detecting the presence of a tire on the first housing, and
  electronic means for activating the wear detecting device during the detection of the presence of a tire by the presence detecting device.

The wear detecting device comprises, in an advantageous embodiment, a housing with an application face intended to be in contact with the surface of the tire and a sensor placed in the housing which can measure the distance d which separates said sensor from the metal reinforcement forming the tire. The sensor includes, for example, a static or alternating magnetic field source and an adjacent sensing element, the source being a coil or a permanent magnet and the sensing element being a sensor, the output signal of which can, for example, vary depending on the level of the local magnetic induction field. In this case, the sensing element is positioned such that the strength of the magnetic field varies when the distance d decreases.

In an embodiment, the sensing element is selected from the group of the Hall effect or magneto-resistive sensors. The detecting device advantageously comprises several sensors of the same type, installed in the housing placed on the ground.

In a preferential embodiment, the system is such that the distance, projected over a surface parallel to the driving ground, between the first presence detecting device and the wear detecting device is greater than the distance traveled by a vehicle at a predetermined speed in a time corresponding to the time necessary for activating the wear detecting device.

In another preferential embodiment, the system is such that the distance, projected over a surface parallel to the driving ground, between the access ramp and the wear detecting device is greater than the distance travelled by a vehicle at a predetermined speed in a time corresponding to the time necessary for activating the wear detecting device. This embodiment is particularly advantageous when the wear detecting device is activated by the transmission of a shock wave to the central electronics. In this case, the propagation of the shock wave can be regarded as almost instantaneous, but the electronics waking time will remain greater than this propagation time. The distance between the access ramp and the wear system must therefore remain sufficient to allow these electronics to waken before the tire is vertical with respect to the wear sensors.

The time required for the activation of the wear detecting device is, for example, approximately ten milliseconds. The predetermined speed is, for example, a maximum speed recommended for the use of the evaluating system, or a speed above which the proper operation of the system is not guaranteed for a user.

In another advantageous embodiment, the first device for detecting the presence of a tire comprises at least one element from the group comprising: a ferroelectric (PP, CYTOP, etc.) sensor, an organic piezoelectric sensor, a piezoelectric cable and/or fibre, a piezoelectric transducer, a piezoelectric bimetallic strip or a sensor produced in the form of an inorganic piezoelectric composite applied to a supporting means. The piezoelectric composite can, for example, be a paint with an addition of barium titanate, an oxide known for the ferroelectric properties thereof. Any other element having ferroelectric properties, such as for example and without limitation, TGS, PZT, BST, $KNbO_3$, $LiNbO_3$, $LiTaO_3$, could be used as an additive to a conventional paint to form a piezoelectric composite that can be used within the scope of the present invention.

In an advantageous embodiment, the presence detecting device is directly fixed on the housing, for example in a cavity provided in the housing. Thus, the detecting device can be positioned parallel to the ground receiving the housing, or in another direction. Preferably, the device is protected from external attack, such as rain. Thus, in another embodiment, the device may be embedded in the material forming the housing, or in an additional protective resin.

Furthermore, the device is preferably arranged such that the electroactive element, for example of piezoelectric type, contained therein is only compressively stressed when a vehicle passes over the housing, in order to avoid any deterioration of the device.

In another embodiment, the presence detecting device is fixed on a substrate, for example a printed circuit substrate, the substrate being rigidly connected to the housing, for example by screws, an adhesive, glue, or any other fixing means.

In another embodiment, the system comprises a second device for detecting the presence of a tire, similar to the first presence detecting device. In a first use, this device can be used to detect the end of a vehicle passing over the housing, and can thus be used as a means of switching off the wear detecting device.

In a second use, the evaluating system can be used regardless of the direction of approach of a vehicle. Thus, the presence detecting device chronologically activated first is used to activate the wear detecting device. Advantageously, the presence detecting device chronologically activated second is used to switch off the wear detecting device.

In this second use, the positioning of the second presence detecting device follows the same distance rules as described above for the first presence detecting device. This positioning will be detailed later using figures.

In another embodiment, the system comprises means for detecting that the output value of the wear detecting device becomes lower and/or higher than a predetermined threshold, and for accordingly commanding the detecting device to switch off.

In an advantageous embodiment, the system further comprises means for setting the sensitivity of the tire presence detecting device.

Setting the sensitivity allows, for example, the option of only detecting those vehicles above a certain weight. In particular, this allows for only activating the system when a heavy goods vehicle for which evaluation is desired passes thereover, and not activating the system when a light vehicle passes thereover in an untimely manner.

In this case, the sensitivity setting means are, for example, electronic means, such as are described later using the figures.

Another possibility, in the case where the tire presence sensor is produced by means of a ferroelectric sensor, a piezoelectric composite, a buzzer or a piezoelectric cable positioned against the structure of the housing, consists in adjusting the thickness or the stiffness of the structure of said housing, to reduce to the same extent the deformation, or the shock wave picked up by the tire presence sensor.

It is also possible, in another embodiment, to adjust the thickness or the stiffness of a plate of any material on which the paint is applied, or on which piezoelectric elements are stuck and which is then fixed by any suitable means on the structure.

Yet another possibility, in the case where the presence detecting device uses a piezoelectric paint, is to adjust the thickness and/or the surface of the deposited paint layer in order to adjust the response of the tire presence sensor.

In an advantageous embodiment, the electronic means for activating the wear detecting device comprise means of modifying an operating mode of the various microcontrollers of the wear detecting device.

In another embodiment, the electronic means for activating the wear detecting device comprise means for acting upon the power supply of the wear detecting device. More precisely, the electronic means can act upon the power supply of the mother board of the wear detecting device, but also on the power supply of the RFID reading functionalities of the detecting device, or finally on the wireless information transmission functionalities of said device.

BRIEF DESCRIPTION OF THE FIGURES

Other aims and advantages of the invention will appear clearly in the following description of a preferred, but nonlimiting, embodiment, illustrated by the following figures wherein.

DESCRIPTION OF THE PREFERRED EMBODIMENT OF THE INVENTION

Figure 1:
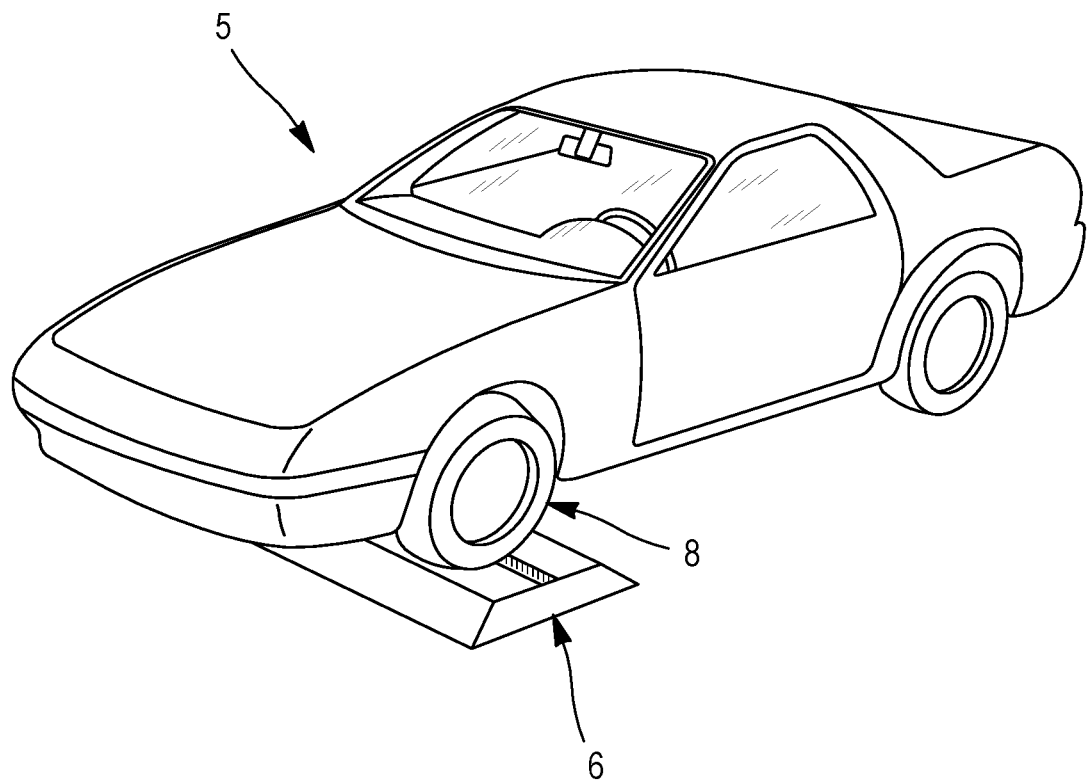
FIG. 1 is a perspective view of a vehicle, a tire of which passes over a housing which is part of a system according to the invention, FIGS. 2a, 2b, 2c; 3a, 3b, 3c; and 4a, 4b, 4c show several embodiments of the system according to the invention, respectively, with tire presence detecting device variants, all of which are sensitive to the deformation of the housing.

FIG. 1 shows a vehicle 5, the tire 8 of which travels over a housing 6 which is part of an evaluating system according to the invention. The figure shows a passenger vehicle but such a system can also be used for any other vehicle, such as a heavy goods vehicle or a bus. The wear condition of the tire 8 is detected when the tire travels over the housing 6 without it being necessary to stop the vehicle or remove the tire of the vehicle.

In this embodiment, the housing is in the form of a land vehicle speed bump made of a material suitable for resisting multiple tires passing thereover without deteriorating. The material is, for example, a composite based on vinyl ester resin, reinforcing fibreglass, and various additives well known to a person skilled in the art.

Figure 2A:
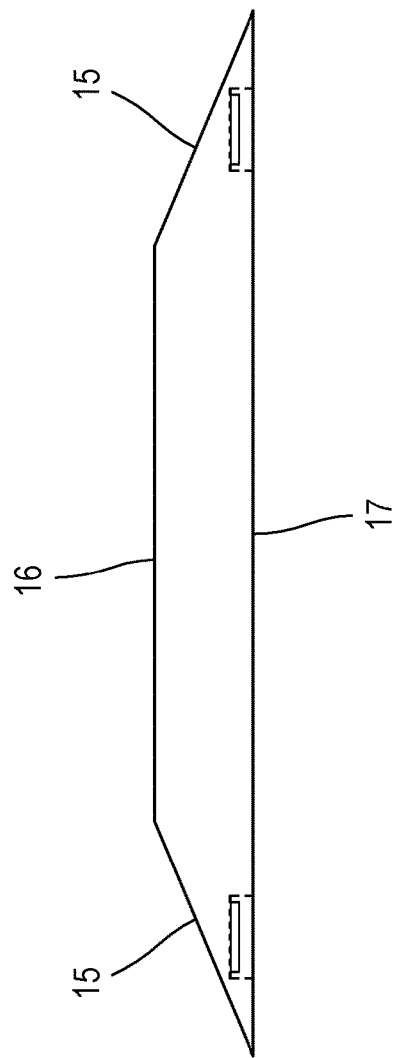
Figure 2B:
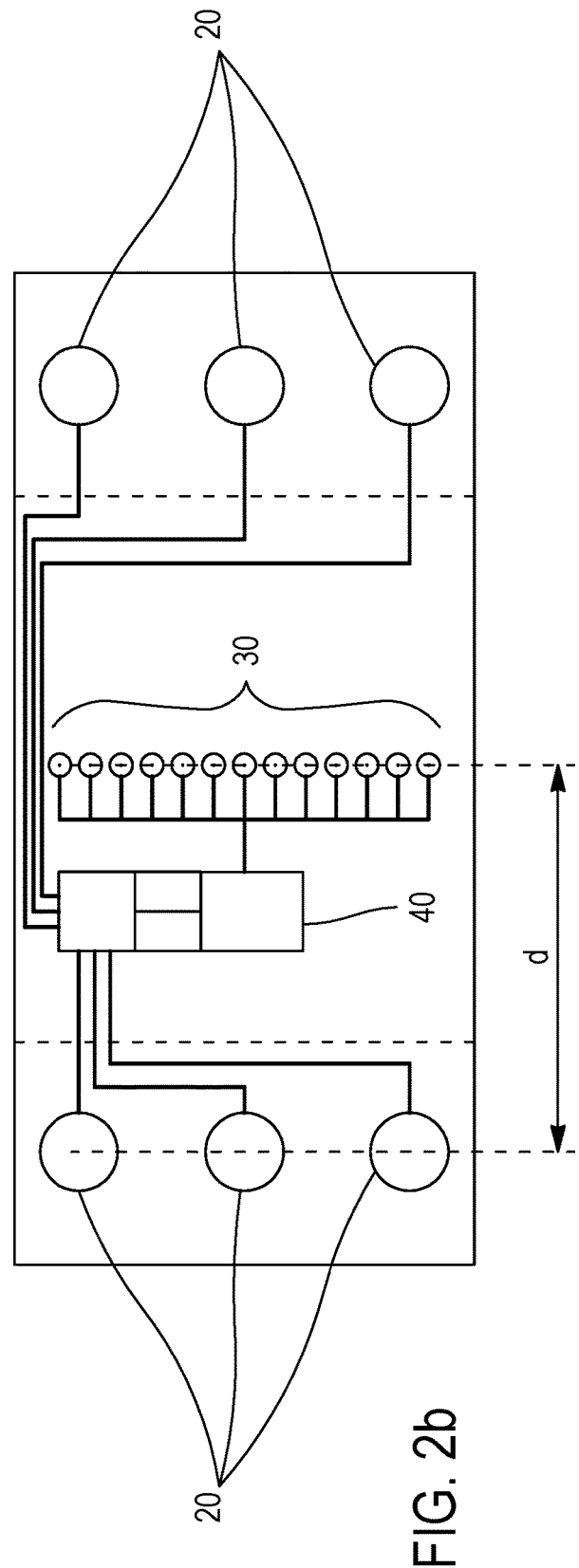
Figure 2C:
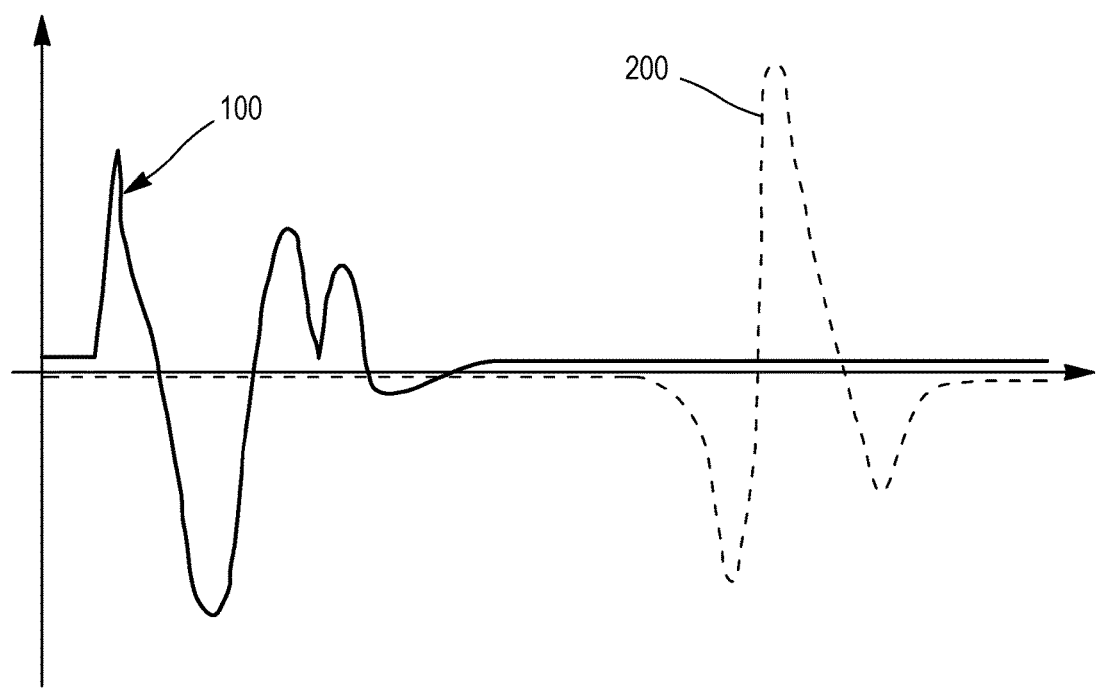

FIGS. 2a, 2b and 2c show an example of carrying out the system according to the invention, made up of a housing containing the wear measuring device and two tire presence detecting devices, and an example of signals received by the tire presence detecting devices which is contained in said housing.

In this example, the tire presence detecting device is sensitive to the deformation of the housing when a tire passes thereover.

The housing is made up of two access ramps 15 and of a horizontal wear measuring area 16.

However, the invention is not limited to this embodiment, and the housing can take, for example, any other form of a portable object having a lower surface 17 allowing positioning on a driving ground. Therefore, in a particularly favourable embodiment, the ground is prepared with a suitable concrete and fine finishing, for obtaining a good level of flatness.

In the example of FIGS. 2a and 2b, the housing includes, in each ramp 15, a device for detecting the presence of a tire. In the example described, each of these devices includes three piezoelectric sensors 20, positioned along a line transverse to the driving direction of a vehicle arriving on the housing. Therefore, the presence of a vehicle is detected by either of the presence detecting devices before a tire of the vehicle is located on the measuring area 16. This has the advantage of making the system insensitive to the driving direction of the vehicle, since it can arrive on the system via either of the access ramps 15.

The sensors 20 are connected to an electronic unit 40 allowing the wear to be evaluated via the wear sensors 30. As previously mentioned, the distance d between the presence detecting device, in this case in the form of sensors 20, and the wear detecting device, in this case in the form of sensors 30, must be sufficient such that the electronic unit 40 can be activated by the sensors 20 before the tire tread reaches the sensors 30.

This distance d is calculated as a function of the maximum speed at which the vehicles will pass over the system and by taking into account the time necessary for waking and/or starting up the various electronic functions of the system.

In an example, the vehicle speed recommended for the use of an evaluating system according to the invention is 50 km/h. If the time necessary for activating the unit 40 is approximately 10 ms, this means that the distance d must be greater than 13 cm to ensure correct wear detection.

Preferably, the distance d is less than 1 meter, in order to ensure a spatial requirement and a cost of the system which are as low as possible.

Advantageously, the number and the arrangement of the sensors 20 are selected such as to ensure the detection of the presence of any tire, regardless of the width thereof. Therefore, in a case of using the present system for evaluating heavy goods vehicle tires, it is helpful that the distance between two sensors is less than 315 mm. The number of sensors to be used will therefore be determined according to the total width of the housing.

The electronic unit 40 comprises several elements necessary for the operation of the wear detecting device, particularly:
- a RFID reader which allows the identification of the tire or of the vehicle, by means of an antenna, when this can be done by taking advantage of the presence of RFID incorporated in the tire structure, or positioned on the vehicle;
- a wireless communication module for sending the information remotely, via an additional antenna; and
- a power supply distributing the current necessary for the entire system, using a battery.

Since each of the access ramps is provided with the presence detecting device, the vehicle can access the system in the same manner by either of the access ramps 15 in order to measure wear.

FIG. 2c shows the two output signals of the tire presence sensors based on piezoelectric buzzers 20 stuck to the structure of the system according to the invention.

The curve formed as a continuous line shows the amplitude of the voltage emitted by the tire detecting system when a tire passes over the first ramp for accessing the wear measuring system.

The curve formed as a dotted line represents the amplitude of the voltage emitted by the tire detecting system when said tire passes over the second ramp for accessing the wear measuring system.

The two voltage peaks 100 and 200 can be used to cause the measuring electronics to waken, then to cause the measuring electronics to be put into standby mode, when the tire leaves the wear measuring system.

This can, for example, be achieved by means of electronics reacting to a voltage threshold.

FIGS. 3a, 3b and 3c show an embodiment of the invention using a device for detection by means of a piezoelectric cable.

In this example, the tire presence detecting device is sensitive to the deformation of the housing when a tire passes over said housing.

In this embodiment, the presence detection uses a piezoelectric cable 320 integrated into the structure of a tire wear measuring system 10. The sensor is in the form of a coaxial cable 320 inside which the two electric conductors are separated by a piezoelectric material. This cable 320 is positioned in a groove 300 arranged directly in the structure of the tire wear measuring system, at the bottom of a groove 400 having a greater width and depth. The dimensions of the groove 300 are such that the depth thereof does not exceed the diameter of the piezoelectric cable 320.

The cable is held in position in the groove 300 by means of a plastic piece 50 fixed to the bottom of the larger sized groove 400. The two electrodes of the piezoelectric cable 320 are directly connected to the control electronics 60 of the wear measuring system 10. When a tire 70 arrives on the system, the deformation created by the tread on the access ramp 15 of the system produces a positive voltage peak 80 between the two electrodes making up the piezoelectric cable, which peak can be seen in FIG. 3c. This voltage peak 80 can be used to trigger the waking of the control electronics 60 of the wear measuring system 10.

The thickness e of material separating the surface of the access ramp 15 from the piezoelectric cable 320 controls the intensity V of the voltage maximum peak 80 emitted by the cable 320, since it is sensitive to the deformation of the structure created by the tire. Furthermore, the stiffness of the material forming the structure of the system can also be adjusted to control the amplitude V of the voltage maximum peak emitted by the cable 320.

These examples of the method for setting the amplitude of the voltage peak 80 can allow, for example, for the option of only detecting those vehicles above a certain weight. In particular, this allows for activating the system only when a heavy goods vehicle for which the evaluation is desired passes thereover, and for not activating the system when a light vehicle passes thereover in an untimely manner.

This embodiment also has the advantage of allowing a continuous detection over the entire width of the ramp 15. Moreover, the use of a piezoelectric cable allows for a single connection between the presence detecting device and the wear detecting device. However, in the case illustrated in FIG. 2b, it is necessary to produce several connections, between each sensor 20 and the electronic unit 40.

FIGS. 4a, 4b and 4c show an embodiment of the invention using a device for detection by means of a piezoelectric paint, directly applied on an inner face of the housing.

In this example, the tire presence detecting device is sensitive to the deformation of the housing when a tire passes over said housing.

In this embodiment, the detecting device is in the form of a piezoelectric paint layer, directly applied between two layers of conducting paints 420 and 430. These layers of conducting paints 420 and 430 each form an electrode on which the control electronics 440 of the wear measuring system 10 is directly connected.

When a tire 70 arrives onto the system, the deformation created by the tread on the access ramp 15 of the system produces a positive voltage peak 600 which can be seen in FIG. 4c and can be used to trigger the waking of the control electronics 440 of the wear measuring system 10.

The thickness e of material on which the tire detecting sensor presses controls the amplitude V of the voltage maximum peak emitted by the sensor, since the latter is sensitive to the deformation created by the tire. Furthermore, the stiffness of the material forming the structure of the system can also be adjusted in order to control the amplitude V of the voltage maximum peak emitted by the sensor.

As in the example of FIGS. 3a, 3b and 3c, these methods of setting the amplitude of the voltage peak 600 can allow, for example, the option of only detecting those vehicles above a certain weight. In particular, this allows for activating the system only when a heavy goods vehicle for which the evaluation is desired passes thereover, and for not activating the system when a light vehicle passes thereover in an untimely manner.

As in the case described in FIGS. 3a, 3b and 3c, this embodiment has the advantage of allowing a continuous detection over the entire width of the ramp 15. Moreover, the use of a piezoelectric paint allows a single connection to be produced between the presence detecting device and the wear detecting device. However, in the case illustrated in FIG. 2b, it is necessary to produce several connections, between each sensor 20 and the electronic unit 40.

Figure 5C:
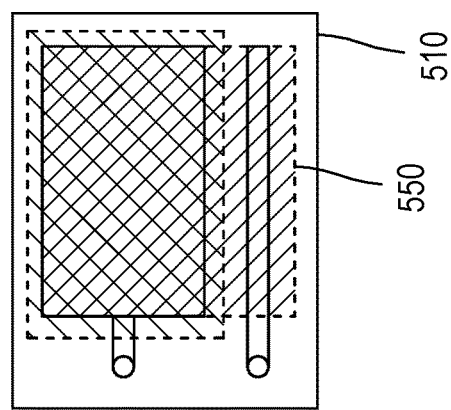
FIGS. 5a, 5b and 5c show the steps of an embodiment of a tire presence detecting sensor using a piezoelectric paint.
Figure 5B:
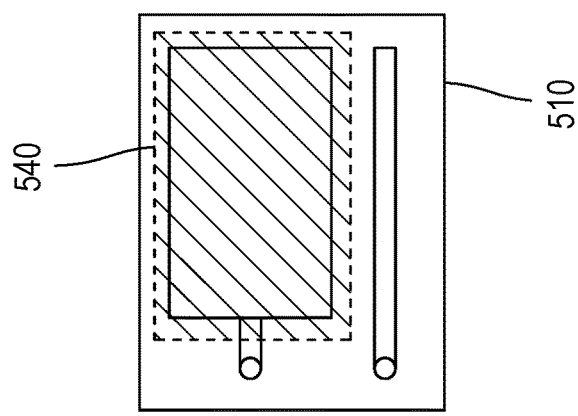
Figure 5A:
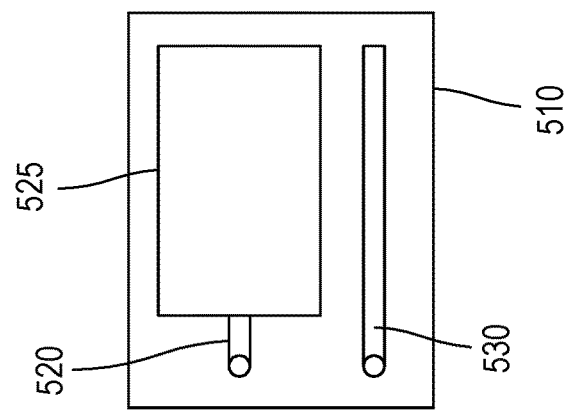

FIGS. 5a, 5b and 5c show the steps of an embodiment of a presence detecting sensor using a piezoelectric paint.

The sensor produced in this example can then be fixed in a wear measuring system for example by gluing or by screwing, such that the shock, or the deformation of the housing produced by the arrival of a tire on the system can be picked up by the sensor.

The first step, shown in FIG. 5a, consists in producing a printed circuit 510 provided with two conductor tracks 520 and 530. The track 520 is connected to a rectangular electrode 525, and the track 530 is a straight track.

The second production step, shown in FIG. 5b, consists in depositing a layer of piezoelectric paint 540 by means of a spray gun or any other means allowing the deposit of a layer of paint that is preferably uniform in thickness.

The third production step, shown in FIG. 5c, consists, after the layer of piezoelectric paint 540 has dried, in applying a layer of conducting paint 550 onto the layer of piezoelectric paint 540, preferably covering the entire surface of the electrode 525 and extending as far as the track 530. Therefore, the piezoelectric paint is positioned between two electrodes and there is easy connection to the resulting sensor by means of simple solder spots on the two tracks 520 and 530.

A last step, not shown in FIGS. 5a, 5b and 5c, consists in subjecting the resulting sensor to a suitable electric field, in order to provide said sensor with the piezoelectric properties thereof.

Compared to the example described in FIGS. 4a, 4b and 4c, this embodiment has the advantage of avoiding the use of conducting paint in order to produce the electrodes necessary for connecting the sensor to the system electronics. This provides greater reliability of the system over time.

Figure 6A:
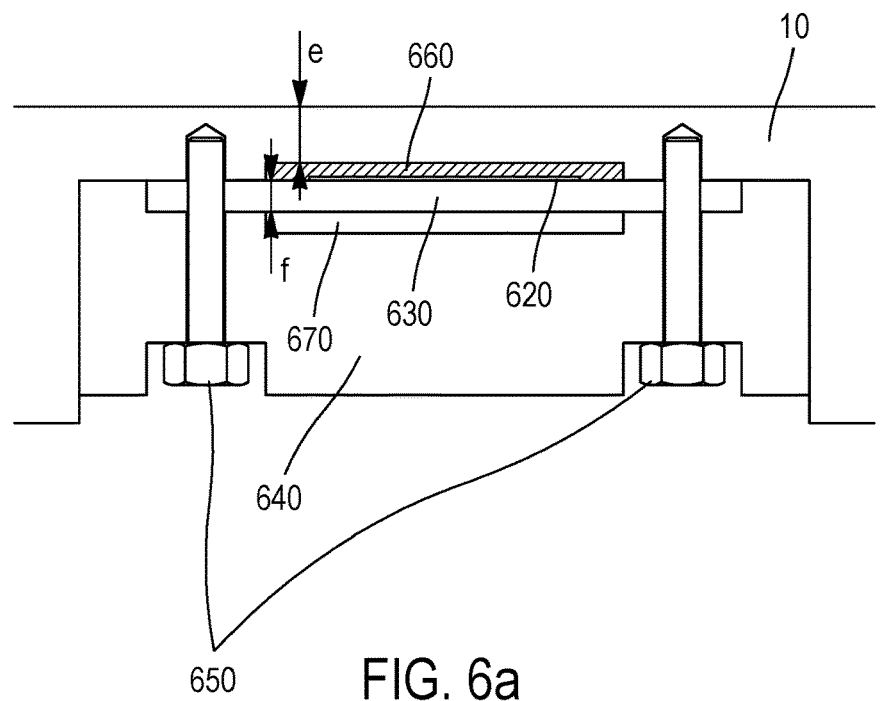
FIGS. 6a, 6b and 7a and 7b show examples of integrating a piezoelectric buzzer in the housing of the system according to the invention.
Figure 6B:
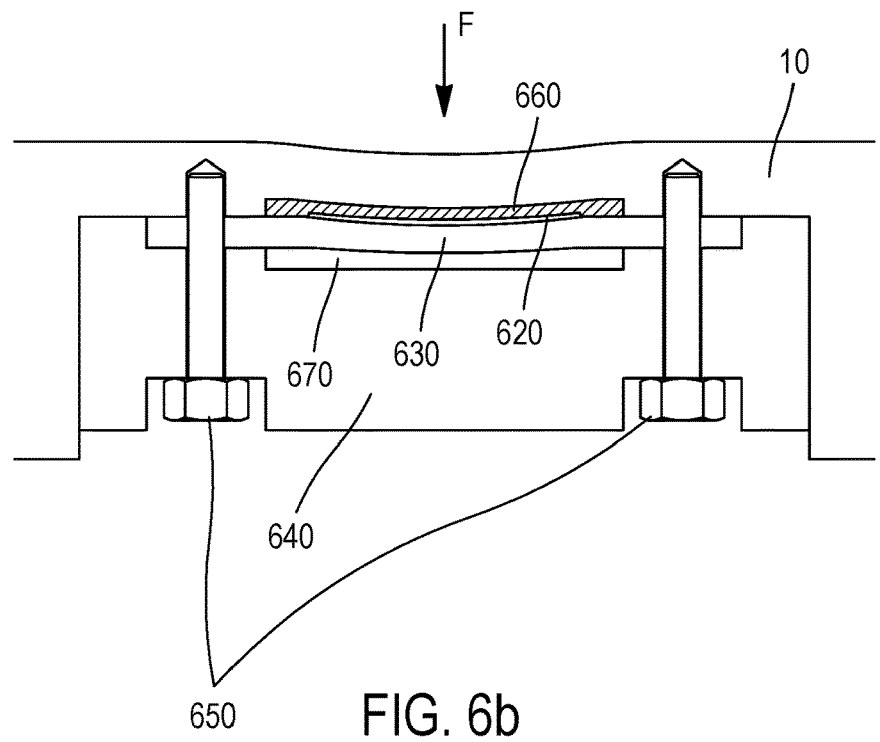
Figure 7A:
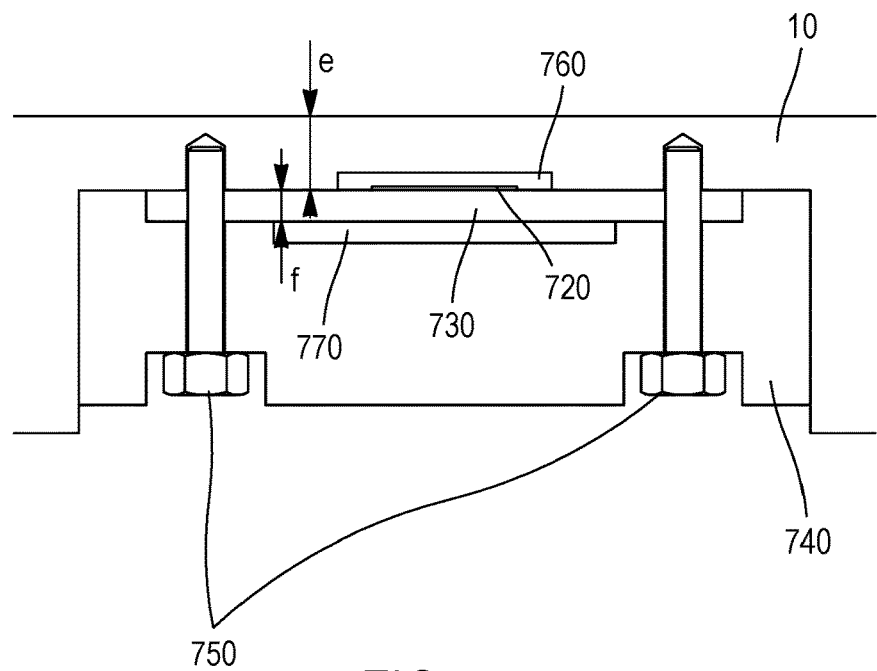
Figure 7B:
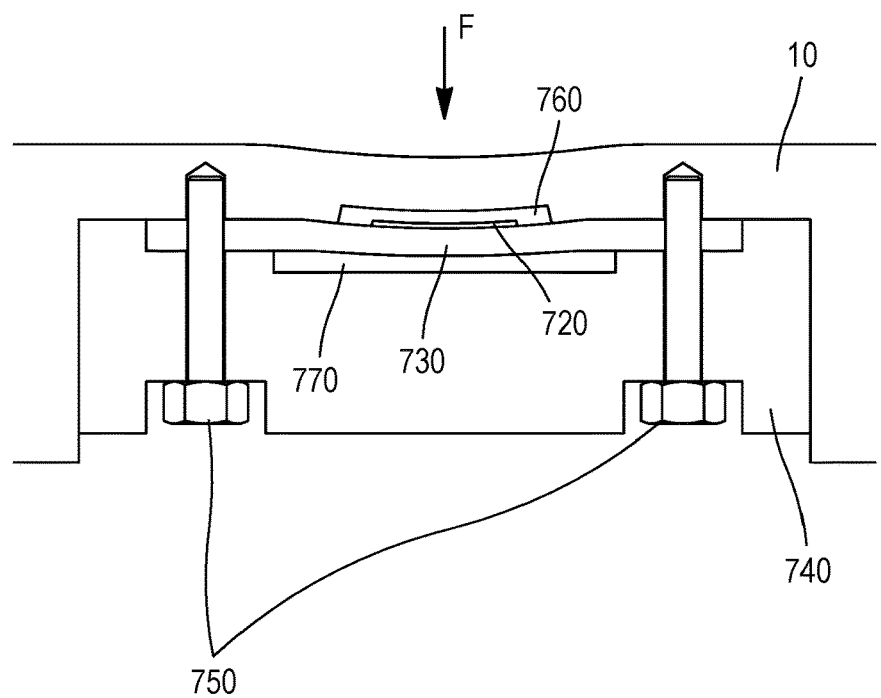

Examples of installing a piezoelectric buzzer in a wear measuring system are shown in FIGS. 6a and 6b and in FIGS. 7a and 7b. In these two examples, the tire detecting system is sensitive to the deformation of the structure of the wear detecting device, when a tire passes thereover. Furthermore, in these two examples, the piezoelectric buzzers work under compression when a vehicle passes over the device. This has the advantage of preventing the appearance, over time, of cracks in the ceramics of the buzzer, which would make the system inoperative.

In the integration methods shown in FIGS. 6a and 6b, a piezoelectric buzzer 620 is positioned on a deformable plate 630, which can, for example, be a simple printed circuit on which the buzzer would be soldered.

This deformable plate is kept pressed against the structure of the wear measuring system 10 by means of a wedging piece 640 screwed to the structure 10 by means of two screws 650. The deformable plate 630 also has the screws 650 passing therethrough, such that it is held more easily in position. Finally, this deformable plate 630 has a stiffness that is preferably less than that of the structure of the system, against which it is positioned, but greater than that of the buzzer.

In the example of FIGS. 6a and 6b, a piece 660 of a material fully transmitting the stresses to which it is subjected, for example rubber, is positioned against the buzzer 620, in a first cavity provided to this end in the structure 10, and the dimensions of which are ideally identical to those of the piece 660.

Finally, a second cavity 670 is provided under the deformable plate 630, in the wedging piece 640, vertical to the first cavity. In this example, the dimensions of the second cavity 670 are identical to the dimensions of the first cavity.

When a tire passes over this system, a force F is applied vertically onto this tire detector. Thus, there is a local deformation of the structure 610. Since the piece 660 is flexible and incompressible, produced from a material which fully transmits the stresses to which it is subjected, and housed in a cavity with dimensions ideally identical to that of the piece 660, this local deformation causes, in turn, the deformation of the plate 630 and of the buzzer 620.

All of these deformations can occur when the tire passes thereover, since the second cavity 670 remains empty and is located vertically with respect to the system of the buzzer 620 and of the deformable plate 630.

The amplitude of the electric signal output from the buzzer 620 can be controlled by the local thickness "e" of the structure of the wear measuring system 10 and by the stiffness of the material used to produce this structure 10.

Still within the context of controlling the amplitude of this output signal of the buzzer 620, it is also possible to adjust the thickness f of the deformable plate 630, and the stiffness of this plate by using materials that are stiff to a greater or lesser extent.

In this example, it must be noted that the buzzer 620 works under compression since it is located on the upper part of the deformable plate 630. This is particularly advantageous since it allows the improvement of the lifespan of this buzzer, and therefore of the resulting tire detecting system.

Finally, it is possible to replace the buzzer 620, for example, with a composite produced with a ferroelectric powder base, which composite is directly deposited on the plate 630, like a piezoelectric paint. This plate 630, along with the deposit thereon, can be, for example, produced using the procedures disclosed in FIGS. 5a, 5b and 5c.

In the example of FIGS. 7a and 7b, a first cavity 760 is provided in the structure 10 such that the dimensions of this cavity are greater than the dimensions of the piezoelectric buzzer 720.

A second cavity 770 is provided under the deformable plate 730, in the wedging piece 740, vertical with respect to the first cavity 760, such that the dimensions of this second cavity 770 are greater than the dimensions of the first cavity 760.

In this example, it is the dimensional difference between the two cavities which allows the transmission of the deformation of the structure to the deformable plate 730 on which the buzzer 720 is positioned. The advantage of this, compared to FIGS. 6*a* and 6*b*, is to prevent any friction of an incompressible material on the buzzer 720, and therefore ensure a greater lifespan. This also allows a more economical solution to be achieved, since it is not necessary to use an incompressible piece.

As in the example of FIGS. 6*a* and 6*b*, the stiffness of the deformable plate 730 is preferably less than the structure of the system against which it is positioned, but greater than the stiffness of the buzzer.

When a tire passes over this system, a force F is applied vertically onto this tire detector. Thus, there is a local deformation of the structure 10.

As the cavity 760 has dimensions that are smaller than those of the cavity 770, the structure 10 presses on the deformable plate 730. This leads to the deformation of the deformable plate 730. As the buzzer 720 is positioned on the upper part of the deformable plate 730, it works under compression when these deformations occur.

This is especially advantageous, in particular for improving the lifespan of the piezoelectric buzzer, and therefore of the tire detecting system.

The amplitude of the electric signal output from the buzzer 720 can be controlled by the local thickness "e" of the structure of the wear measuring system 10 and by the stiffness of the material used to produce this structure 10.

Still within the context of controlling the amplitude of this output signal of the buzzer 720, it is also possible to adjust the thickness f of the deformable plate 730, and the stiffness of this plate by using materials that are stiff to a greater or lesser extent.

Finally, yet another embodiment consists in adjusting the dimensional difference between the cavity 760 and the cavity 770. For example, if these two cavities have a circular shape, the ratio of the diameters will control the amplitude of the electric signal output from the buzzer. In this case, between two dimensional solutions, the solution with the diameter ratio furthest from 1 will provide a greater signal amplitude.

As in the case of FIGS. 6*a* and 6*b*, it is possible to replace the buzzer 720, for example, with a composite produced with a ferroelectric powder base, which composite is directly deposited on the plate 730, like a piezoelectric paint. This plate 730, along with the deposit thereon, can be, for example, produced using the procedures disclosed in FIGS. 5*a*, 5*b* and 5*c*.

Figure 8A:
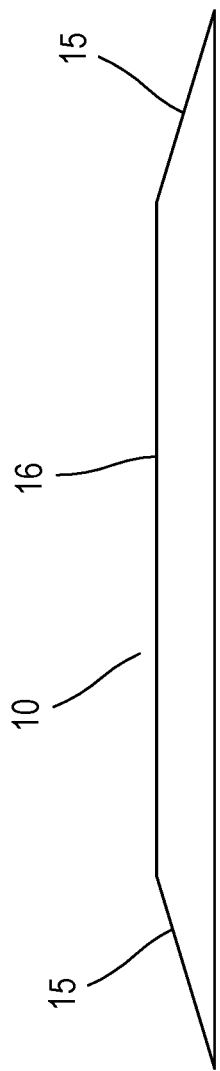
FIGS. 8a, 8b and 8c show an embodiment of the system according to the invention with a tire presence detecting device sensitive to the shock caused by the arrival of a tire on the system.
Figure 8B:
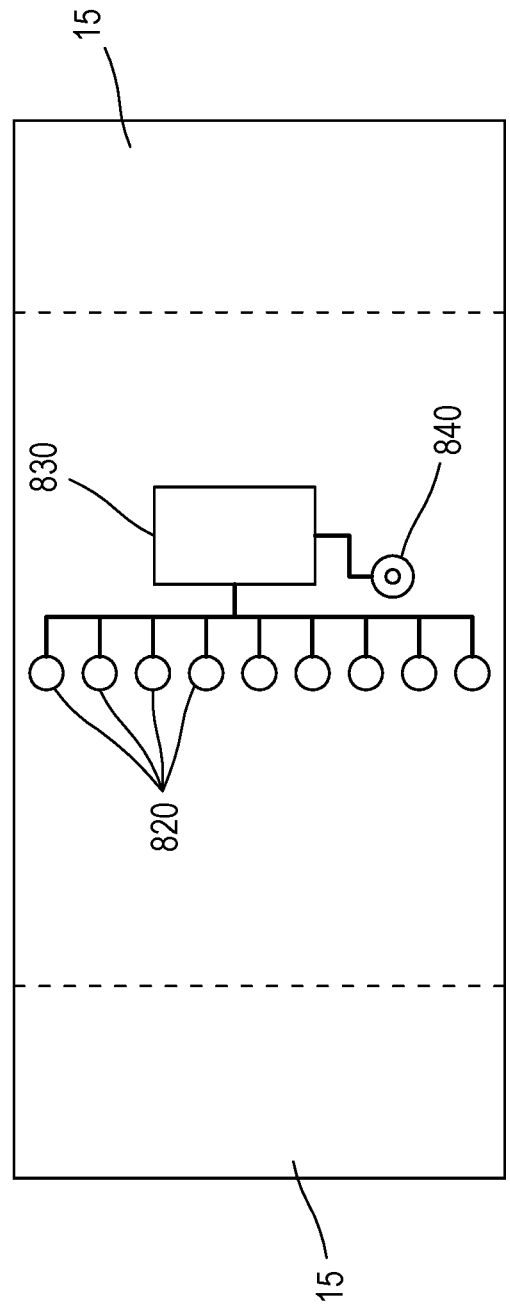
Figure 8C:
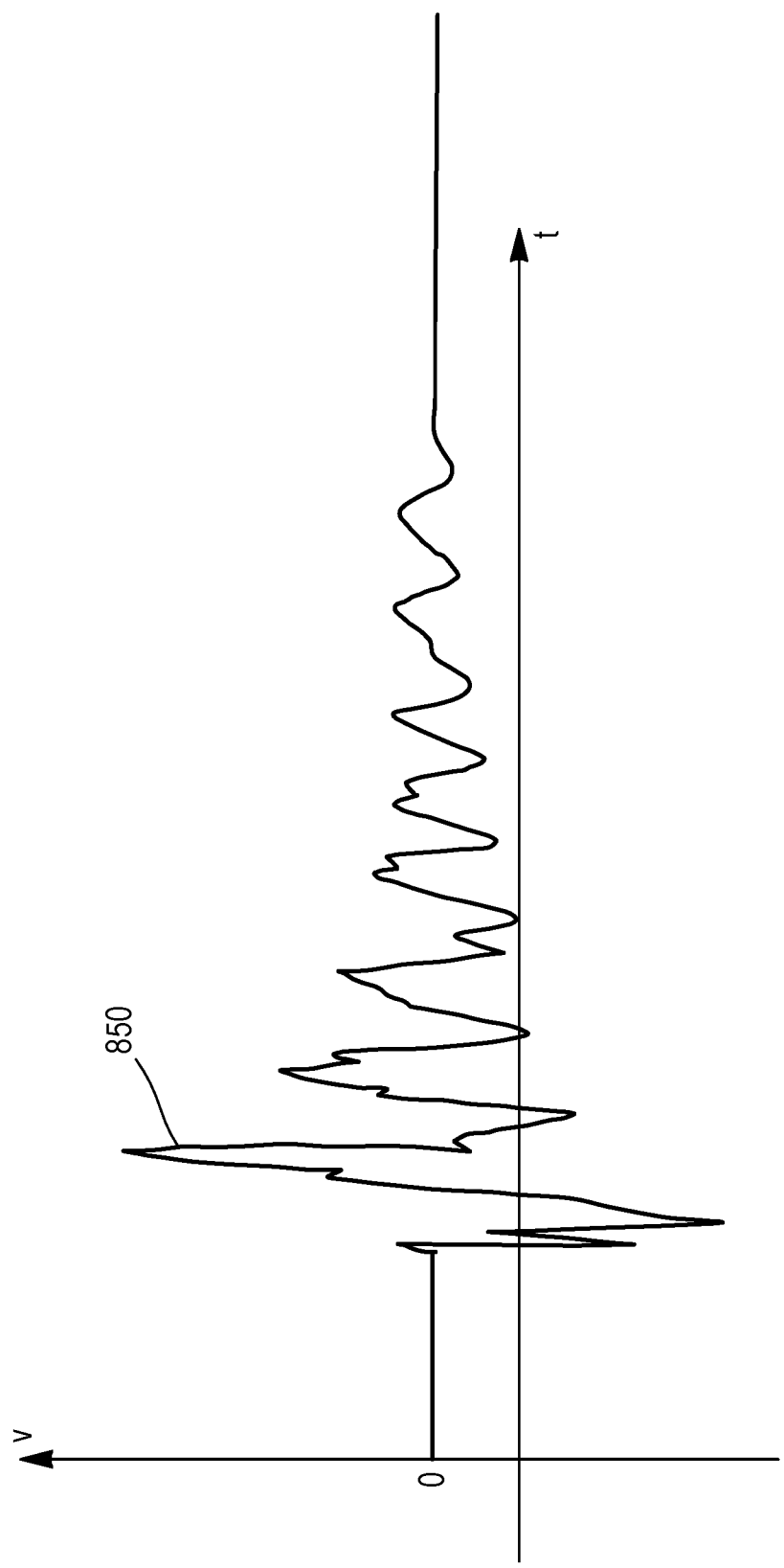

FIGS. 8*a*, 8*b* and 8*c* show a schematic diagram example of a wear measuring system and of a signal emitted by the device for detecting the presence of a tire integrated into this wear measuring system.

In this example, the tire detecting system is sensitive to the shock wave caused by the arrival of a tire on the wear detecting device.

In this example, the housing of the wear measuring system 10 is in the form of a land vehicle speed bump produced from a material that is suitable for resisting multiple tires passing thereover without deteriorating. This housing 10 is made up of two access ramps 15 and of a horizontal wear measuring area 16, and several wear measuring sensors 820 are accommodated inside this housing.

The housing further comprises an electronic board 830 which allows the management of the measuring process, the identification of the vehicle and of the tires via RFID reading and the radio frequency transmission of all of the information to a remote database.

This electronic board is, for example, activated by means of the piezoelectric sensor 840, when a tire arrives onto the system. In the example of FIG. 8*a*, this piezoelectric sensor is a buzzer stuck to the structure of the wear measuring system 10.

When a tire arrives on the housing, the shock of the tire on any one of the access ramps 15 is transmitted as a vibration in the structure of the wear measuring system, to the piezoelectric buzzer 840.

FIG. 8*c* is a representation of the signal 850 received by the piezoelectric buzzer 840 when a tire arrives onto any one of the access ramps 15 of the housing 10. This signal can then be used as a signal for waking the central electronics 830, for example when this signal 50 becomes greater than a predetermined threshold.

In another embodiment, the buzzer is directly soldered onto the central electronic board 30 and this board is rigidly connected to the structure, for example, by screws or by embedding the entire electronics in a protecting resin, inside the structure. In this case, the vibrations are transmitted from the structure to the buzzer, by passing through the system for fixing the electronics to the structure.

This embodiment has the advantage of only requiring a single connection between the presence detecting device and the wear detecting device. However, in the case illustrated in FIG. 2*b*, it is necessary to produce several connections, between each sensor 20 and the electronic unit 40.

Figure 9:
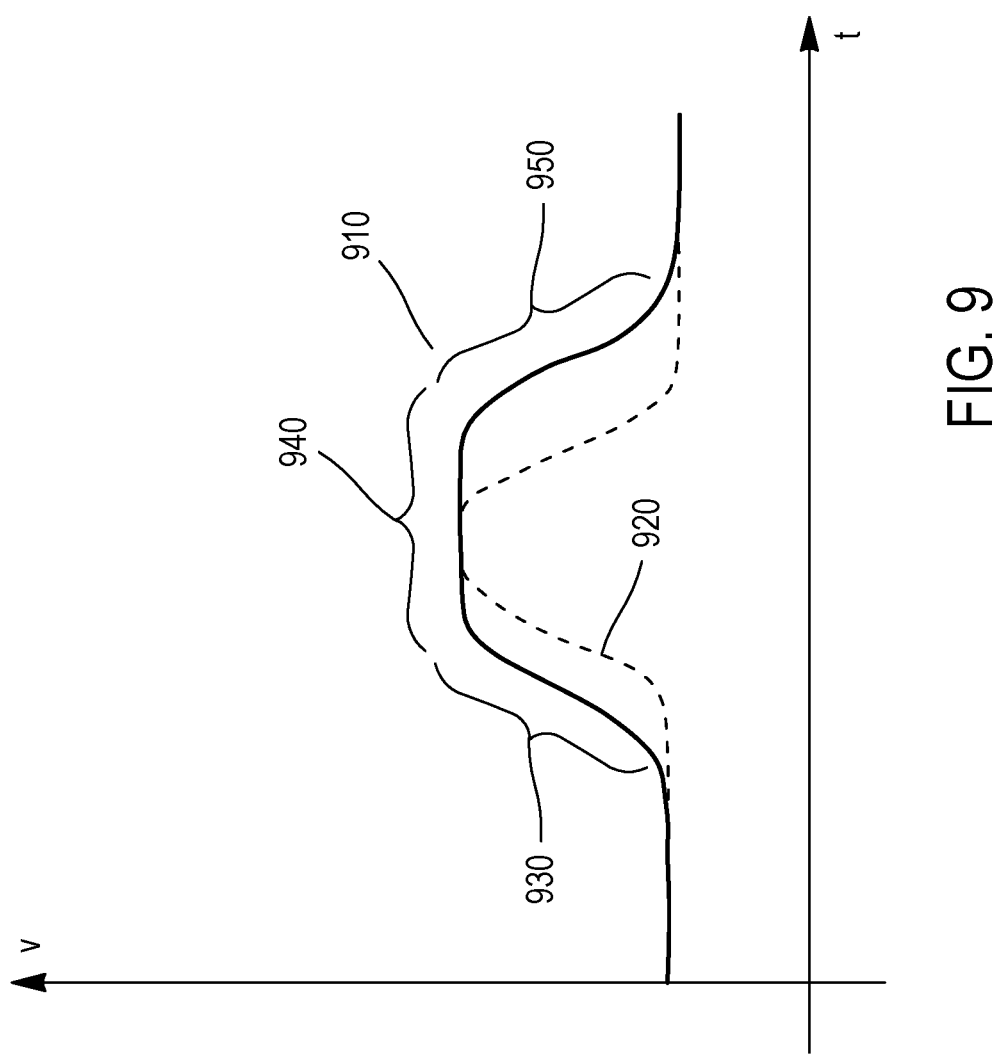
FIG. 9 shows curves representing the output of a wear sensor used in a wear device within the context of the present invention.

FIG. 9 shows an example of the output voltage of a wear sensor when a tire passes thereover. The two curves 910 and 920 shown in this figure are obtained when measuring wear of a tire at two different speeds, the speed used for the curve 910 being less than the speed used for the curve 920.

It is noted that, on each of the curves of this example, the arrival of a tire on a sensor is shown by a rising edge 930. Then, the two curves have a horizontal area 940, which follows the rising edge 930. This area 940 corresponds to the contact surface of the tire passing over the sensor. It is the value of the voltage in this area which is noted for measuring the wear of the tire.

Finally, a falling edge 950 illustrates the end of the passing tire until the complete disappearance thereof, as picked up by the sensor. Therefore, this falling edge can be advantageously used as a signal triggering the standby or the switch-off of the measuring system, since it was possible to utilise the useful area of the curve just beforehand.

In the example of FIG. 9, the output voltage increases when a tire passes vertically with respect to the wear sensors, but the measuring electronics can also be produced such that this voltage decreases when a tire passes thereover. In this case, it is a rising edge which will show the end of a passing tire and which can be used to trigger the switch-off of the measuring system.

Figure 10:
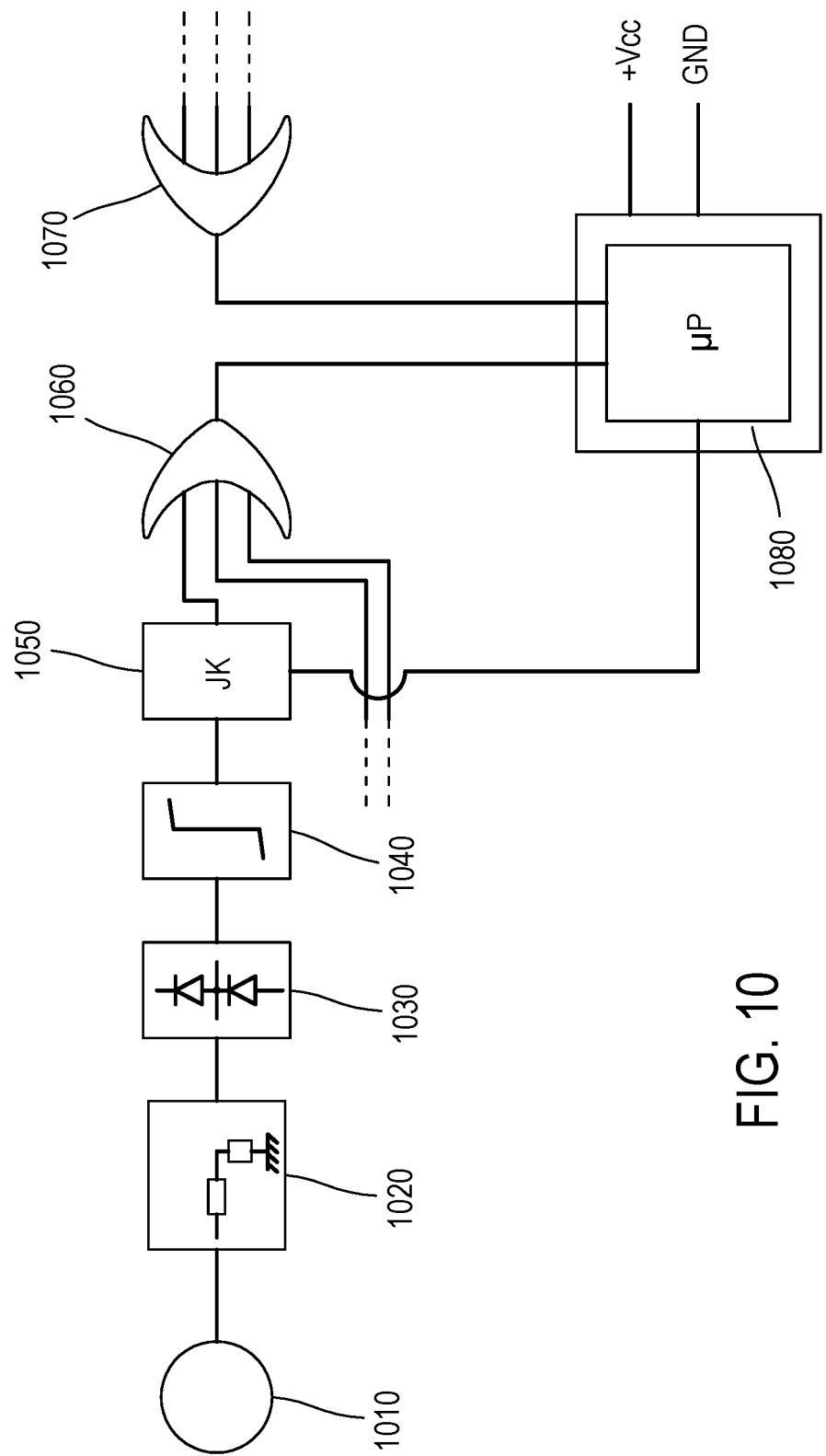
FIG. 10 shows an electronic diagram example of the tire presence detecting device for controlling the waking of the system according to the invention.

FIG. 10 shows a diagram of an electronic system suitable for commanding the system wake-up during the detection of the presence of a tire. These electronics are compatible with the solutions based on detecting the deformation of the housing or with the solutions based on detecting the shock wave caused by a tire arriving on the housing.

In the example of FIG. 10, the tire presence detecting device contains a piezoelectric sensor 1010 for detecting the tire. A first functional block 1020 adjusts the amplitude of the signal to the power supply range of the components. In an embodiment, this functional block 1020 comprises a resistor-based divider bridge. In another embodiment, the functional block 1020 comprises a capacitor connected in parallel with the piezoelectric sensor 1010. This second exemplary embodiment allows discharge of the sensor 1010 to be prevented.

The system further comprises a functional block 1030 for protecting the downstream circuits against excess voltages. This block 1030 comprises, for example, a clamping diode. The system also comprises a functional block 1040 for comparing an analogue signal coming from the piezoelectric sensor 1010 with a predetermined detection threshold. This threshold can be selected, for example, in order to limit the sensitivity of the presence detecting device to the passing of heavy goods vehicle tires alone. In cases of using the system according to the invention for heavy goods vehicles, this advantageously allows the actuation of said system to be prevented for light vehicles for which carrying out measurements is not desired.

The output of this block 1050 is used to control the functional block 1060.

This functional block 1050 comprises an asynchronous flip-flop for memorizing the high state of the signal until acknowledgement by a reset signal coming from a microprocessor 1080. This block preferably comprises a JK flip-flop with an asynchronous reset signal such as the component 74LVC109.

The functional blocks 1020, 1030, 1040 and 1050 are duplicated for each piezoelectric sensor of the system, but they are only shown here once, in the interests of clarity of the figures.

The system finally comprises an OR logic gate 1060, which receives, as input, all of the signals coming from the various piezoelectric sensors, and which allows, as output, a signal to be emitted in order to inform the microprocessor 1080 that one of the piezoelectric sensors spread out along one of the accesses to the wear measuring system has been triggered.

Advantageously, the system also comprises an OR logic gate 1070. This logic gate allows the same function to be achieved as the gate 1060, for piezoelectric sensors installed on another area for accessing the housing.

Figure 11:
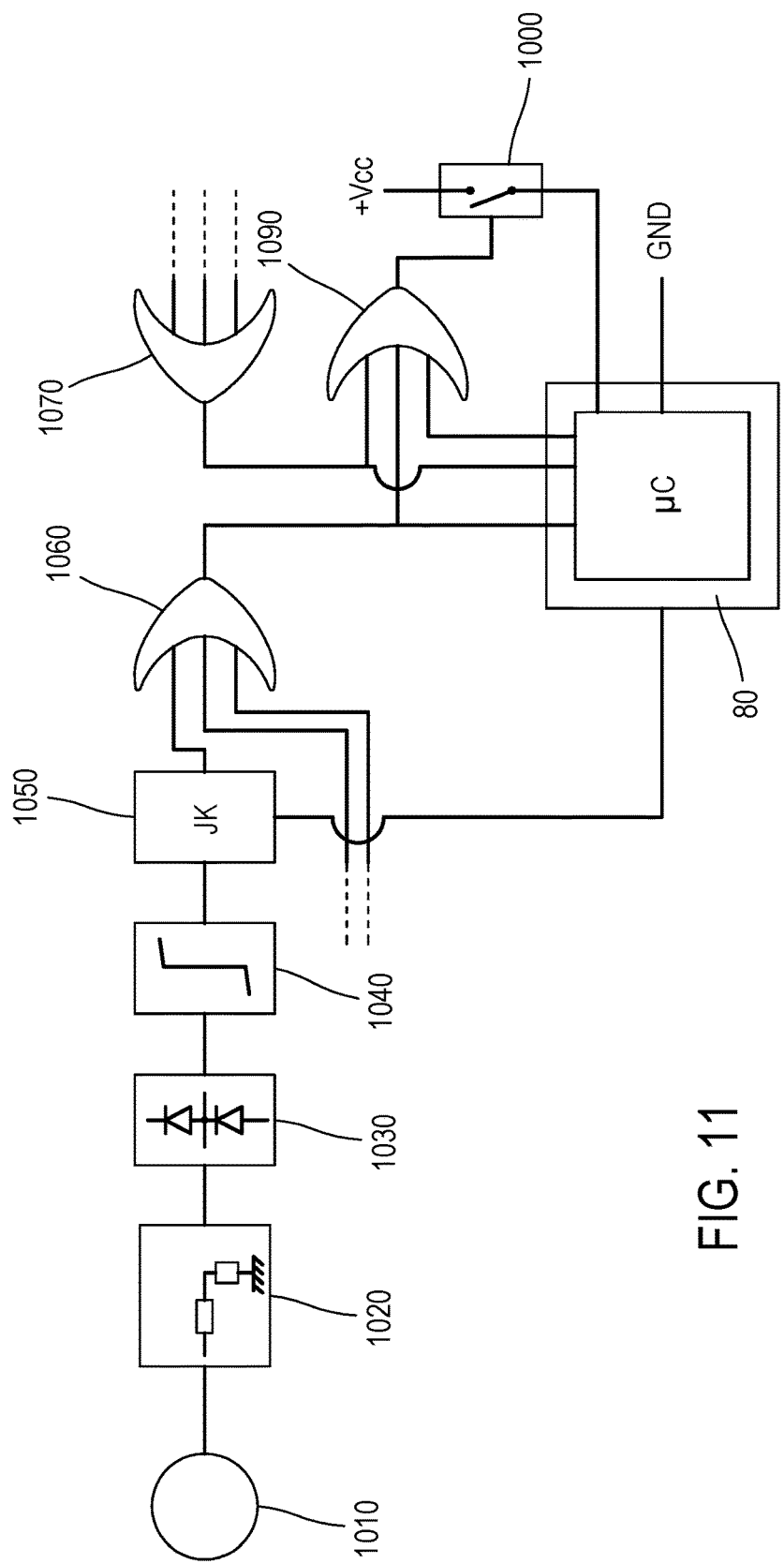
FIG. 11 shows a variant of the electronic diagram of FIG. 10 which allows the complete start-up of the system according to the invention to be controlled.

FIG. 11 shows another diagram of an electronic system suitable for commanding the waking of the system during the detection of the presence of a tire. These electronics are also compatible with the solutions based on detecting the deformation of the housing or with the solutions based on detecting the shock wave caused by the arrival of a tire on the housing.

This diagram is similar to that of FIG. 10 with respect to the sensors 1010 and the functional blocks 1020, 1030, 1040, 1050, 1060 and 1070.

The difference with respect to FIG. 10 is the presence of an OR logic gate 1090, for commanding a switch 1000 controlling the power supply of the microcontroller. This microcontroller can, by means of a logic signal, force the continuation of the power supply even after reset of the blocks 1050.

The advantage provided by this solution compared to the example of FIG. 10 is allowing the complete start-up and stop of the system. This allows the electricity consumption of the assembly to be reduced as much as possible.

The invention claimed is:

1. A system for evaluating a tire condition, the system comprising:
    a housing;
    a tire-wear detector, which detects a tire-wear condition;
    a tire-presence detector, which detects a presence of a tire on the housing; and
    an electronic activator, which activates the tire-wear detector when the tire-presence detector detects the presence of the tire on the housing,
    wherein the tire-wear detector, upon activation, detects the tire-wear condition of the tire when the tire passes over the housing while the housing is placed on a ground surface,
    wherein the tire-presence detector detects the presence of the tire on the housing by detecting vibrations caused by contact of the tire on the housing, and
    wherein the tire-wear detector is deactivated in accordance with a signal from the tire-wear detector.

2. The system according to claim 1, wherein a distance, projected over a surface parallel to the ground surface, between the tire-presence detector or an access ramp and the tire-wear detector is greater than a distance traveled by a vehicle at a predetermined speed for a time duration corresponding to an amount of time necessary for activating the tire-wear detector.

3. The system according to claim 1, wherein the tire-presence detector detects vibrations from a shock wave that spreads in the housing upon contact of the tire on the housing.

4. The system according to claim 1, wherein the tire-presence detector includes at least one of: a ferroelectric sensor, an organic piezoelectric sensor, a piezoelectric cable, a piezoelectric fibre, a piezoelectric transducer, a piezoelectric bimetallic strip, and a sensor formed of an inorganic piezoelectric composite applied to a support.

5. The system according to claim 4, wherein the tire-presence detector is fixed directly on the housing.

6. The system according to claim 4, wherein the tire-presence detector is fixed on a printed circuit or a plate that is rigidly connected to the housing.

7. The system according to claim 4, wherein the tire-presence detector is embedded in a material forming the housing.

8. The system according to claim 1, further comprising a second tire-presence detector, which detects a presence of a tire on the housing.

9. The system according to claim 1, further comprising a threshold detector, which detects an output value of the tire-wear detector relative to a predetermined threshold value, and which issues a command to the tire-wear detector to switch off based on a detection result.

10. The system according to claim 1, further comprising a sensitivity adjustment circuit, which sets a sensitivity of the tire-presence detector.

11. The system according to claim 1, wherein the electronic activator includes circuitry for modifying an operating mode of a microcontroller of the tire-wear detector.

12. The system according to claim 1, wherein the electronic activator includes circuitry for affecting a power supply of the tire-wear detector.

13. The system according to claim 8, wherein the tire-wear detector is deactivated in accordance with a signal from the second tire-presence detector.

14. A system for evaluating a tire condition, the system comprising:
    a housing;
    a tire-wear detector, which detects a tire-wear condition;
    a tire-presence detector, which detects a presence of a tire on the housing; and an electronic activator, which activates the tire-wear detector when the tire-presence detector detects the presence of the tire on the housing, wherein the tire-wear detector, upon activation, detects the tire-wear condition of the tire when the tire passes over the housing while the housing is placed on a ground surface, wherein the tire-presence detector detects the presence of the tire on the housing by detecting vibrations caused by contact of the tire on the housing, and wherein the tire-wear detector is deactivated in accordance with a falling edge of a signal from the tire-wear detector.

15. A system for evaluating a tire condition, the system comprising:
a housing;
a tire-wear detector, which detects a tire-wear condition;
a tire-presence detector, which detects a presence of a tire on the housing; and
an electronic activator, which activates the tire-wear detector when the tire-presence detector detects the presence of the tire on the housing, wherein the tire-wear detector, upon activation, detects the tire-wear condition of the tire when the tire passes over the housing while the housing is placed on a ground surface, wherein the tire-presence detector detects the presence of the tire on the housing by detecting vibrations caused by contact of the tire on the housing, and wherein the tire-wear detector is deactivated in accordance with a rising edge of a signal from the tire-wear detector.

16. The system according to claim 10, wherein the sensitivity adjustment circuit sets a sensitivity of the tire-presence detector so that the tire-presence detector detects a heavier vehicle tire but not a lighter vehicle tire.

17. The system according to claim 1, wherein the housing comprises a ramp.

18. The system according to claim 17, wherein the tire-presence detector is not located in the ramp.

19. The system according to claim 1, wherein the tire-presence detector comprises a piezoelectric detector.

* * * * *